United States Patent [19]

Takagi

[11] 4,043,648
[45] Aug. 23, 1977

[54] FILM COUNTER FOR USE WITH A PORTABLE CINE-CAMERA

[75] Inventor: Katsuhide Takagi, Okaya, Japan

[73] Assignee: Sankyo Kogaku Kogyo Kabushiki Kaisha, Suwa, Japan

[21] Appl. No.: 561,503

[22] Filed: Mar. 24, 1975

[30] Foreign Application Priority Data

Mar. 23, 1974 Japan .................................. 49-32260
Mar. 23, 1974 Japan .......................... 49-32629[U]

[51] Int. Cl.² .......................... G03B 23/02; G03B 1.60
[52] U.S. Cl. ........................................ 352/72; 352/172
[58] Field of Search ............... 352/170, 171, 172, 72, 352/78 C

[56] References Cited
U.S. PATENT DOCUMENTS

| | | | |
|---|---|---|---|
| 3,578,856 | 5/1971 | Thate | 352/172 |
| 3,601,479 | 8/1971 | Komine | 352/172 |
| 3,807,841 | 4/1974 | Dudley | 352/72 |
| 3,918,802 | 11/1975 | Sakaguchi | 352/172 |

Primary Examiner—Monroe H. Hayes
Attorney, Agent, or Firm—Sughrue, Rothwell, Mion, Zinn and Macpeak

[57] ABSTRACT

A film counter for use with a portable cine-camera capable of selectively using two types of cartridges, respectively, containing photographic films of different lengths. The film counter comprises a cartridge detection mechanism having a detection lever which is operated only when one of the two types of cartridges is loaded in the camera. A gear train assembly is provided for driving a counter indicator at a speed ratio corresponding to the length of the photographic film. The gear train assembly is switched between first and second speed ratios under control of the detection lever. The detection lever also controls a counter indicator by switching the numbers displayed on the counter indicator to a group of numbers suitable for the film length in the type of cartridge loaded in the camera.

14 Claims, 17 Drawing Figures

FILM COUNTER FOR USE WITH A PORTABLE CINE-CAMERA

BACKGROUND OF THE INVENTION

This invention relates to a film counter in a portable type cine-camera and, in particular, a cine-camera capable of using selectively two types of cartridges, each of a different shape, each containing a different type of photographic film, and each film having a different length, wherein the counting indications are automatically caused to suitably correspond to the respective length of film contained in the cartridge loaded on the camera.

The conventional cine-cameras used mostly by amateurs are easy to carry and are adapted for use with 8 mm or 16 mm width film. Eight mm film cartridges are usually packed with a standard length of photographic film, e.g., 50 ft. The film counter is automatically returned to zero by the loading action and, thereafter, advances as the photography operation proceeds. In some larger cameras, a 16 mm film cartridge can be loaded on the top of the camera body. Such films are typically 200 ft. long. In either case, the maximum film length is determined by the type of camera, and each type of camera usually uses only one type of commercial film. Accordingly, a film counter on the camera is only required to perform counting for one type of film.

It has recently become desirable to provide portable type cine-cameras which record sound with the pictures. The use of 8 mm film in combination with sound recording tracks, sound recording means and photography means has been studied for this purpose. However, 8 mm film is not suitable because such film is usually only 50 ft. in length, thereby providing only about 3 minutes for sound and photography. That short period of time is often considered too short for sound pictures.

Thus, it has been necessary to provide a camera capable of selective use with a longer film, e.g., 200 ft., or a standard film, e.g., 50 ft. This necessarily requires a film counter capable of selectively counting the lengths of the longer and shorter films.

SUMMARY OF THE INVENTION

According to the present invention a film counter is provided in a cine-camera capable of loading two types of cartridges selectively adapted to contain two kinds of photographic films of different lengths. A detection lever detects the type of cartridge loaded in the camera. A gear train assembly capable of being selectively actuated to provide a speed ratio in accordance with the ratio between the lengths of two films and a counter mechanism operating in synchronism with the film driving mechanism by way of said gear train are provided. The gear train assembly provides a speed adjusted to said loaded cartridge, and said detection lever provides to the counter mechanism suitable count indications for the loaded cartridge.

A primary object of the present invention is to provide a film counter capable of automatically turning the indications of the film counter depending upon a certain loaded cartridge by the loading action of the cartridge, making use of the difference in the configuration of two types of cartridges and thus automatically setting the camera for operation without requiring other counter adjustment settings.

Another object of the present invention is to provide a film counter that is made compact by incorporating indication components, such as an indicator for film counting, scales for the indication of the film length, etc. into a depression formed at the bottom of the dish-shaped rotary durm that is assembled as a member of the gear train and, further, placing and disposing within a recess of said drum means to actuate a switch for the operation of a mechanism indicating the exhaustion of a photographic film, a spring for returning the film counter to zero by the unloading of the cartridge from the camera, and the like.

A further object of the present invention is to provide a film counter in which, in the counter indication section, setting of scales on a dial plate to either of two rows of figures on an indication plate indicative of the length of the spent photographic film as well as to intermediate locations between the two rows of figures indicative of the unloading state of the cartridges can be attained securely and smoothly without increasing the volume of the counter mechanism by shifting either one of said two plate members to the other in parallel by and simultaneously with the displacement of the detection lever.

Still another object of the present invention is to provide a film counter comprising a detection lever mechanism consisting of a first lever capable of engaging both of the cartridges and a second lever capable of engaging only the cartridge containing a longer photographic film, whereby three types of information, that is, types of the respective loaded cartridges and the absence of the cartridges can be automatically transmitted to the indication mechanism.

The present invention will be understood more clearly by way of the preferred embodiments thereof referring to the accompanying drawings.

DETAILED DESCRIPTION OF THE PREFERRED EMBODIMENTS

Figure 1:
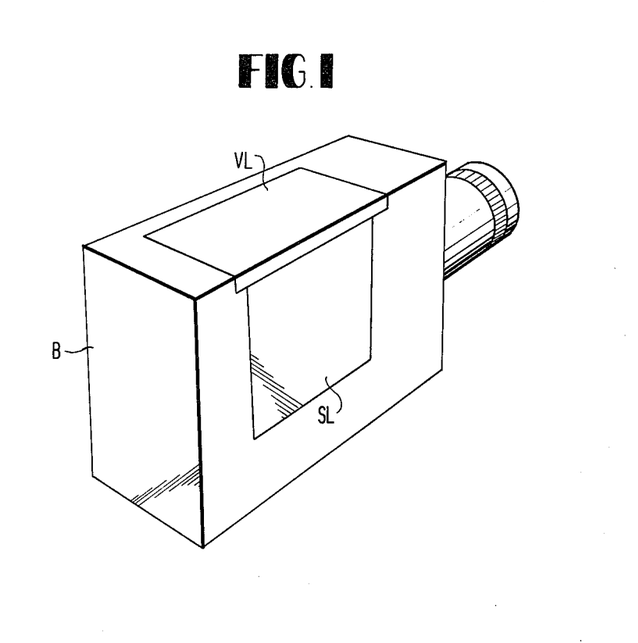
FIG. 1 is a perspective view of a cine-camera to which the present invention is applied.

The present invention is to be described referring to FIG. 1 of the accompanying drawings which presents a perspective view of a camera body showing the relation between covers being closed and opened for the loading and unloading of two types of cartridges. Similar to the conventional cameras of this type, a side cover SL is provided on a side of a camera body in the approximate shape of a rectangular prism to permit loading and unloading of a standard photographic film of 50 ft. length. Also, a top cover VL is provided on the top of the body to permit loading and unloading of a cartridge containing a photographic film of longer length. The two covers are desirably disposed in such a manner that the side cover SL can be closed and opened irrespective of the state of the top cover VL, but the top cover VL can only be opened when the side cover SL is open. This prevents accidental exposure of the longer photographic film by the careless opening of the top cover when the 50 ft. film is loaded. The preferred embodiments of the present invention, to be described hereinafter substantially have such a construction but it is out of the scope of the present invention and, hence, not detailed here.

It is also assumed in the present embodiments that the indication obtained from the film counter can be seen through a view window formed on the side of a camera body opposite to the side cover SL in a manner similar to that in known devices of this type.

Figure 3:
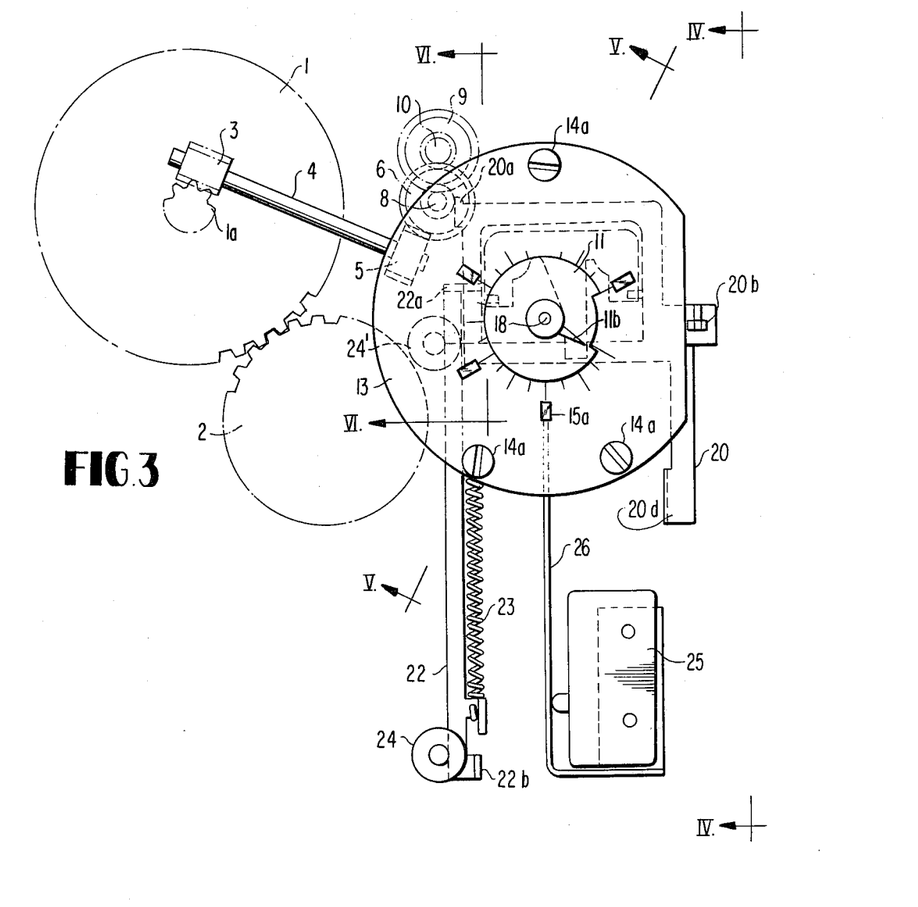
FIG. 3 is a side elevational view of a counter shown by removing the side cover of the camera body and viewed from the side on which indications are to be read.

The counter of the present invention is to be described referring to FIGS. 3 through 14. FIG. 3 shows a counter of the present invention viewed from the side of a camera body provided with the counter indication window. A gear 1 rotated in connection with a shutter mechanism is meshed with a film take up gear 2. The gear 1 is integrally formed with a worm 1a which is engaged with a worm wheel 3. A shaft 4 for supporting at one end the worm wheel 3 is rotatably mounted to an appropriate position of the camera body by suitable means (not shown) and a worm 5 is secured to the other end of said shaft 4. The worm 5 always engages a gear 7 in a gear train assembly GTA for the counter (refer to FIGS. 6A through 6C).

Figure 6A:
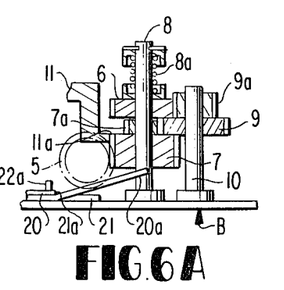
FIGS. 6A through 6C, respectively, shown a part of the section of the counter for illustrating the relation between the position of each gear in a gear train and that of the detection lever when they are situated at positions corresponding respectively to longer and shorter films and at a neutral position.
Figure 6B:
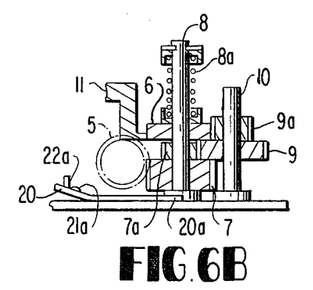
Figure 6C:
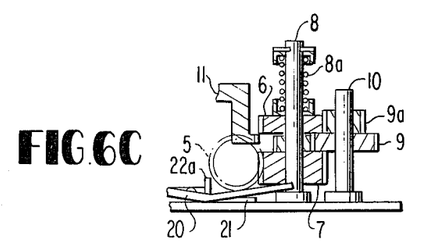

As apparent from FIGS. 6A through 6C, two shafts 8 and 10 are secured in parallel with each other to appropriate positions on a partition wall that separates a compartment for the film driving mechanism and that for cartridges. The gear 7 and a gear 6 are mounted to the shaft 8 and a gear 9 is mounted to the shaft 10 rotatably while slidable in the axial direction. The gear 7 is formed with a pinion 7a of a small diameter at the side of the gear 6 and the gear 9 is formed with a pinion 9a each in an integrated manner and, as illustrated in the figure, engagement is always made between the pinion 7a and the gear 9 and between the pinion 9a and the gear 6. As also can be seen from each of the figures, the axial length (width) of the pinion 7a is made substantially equal to that of the gear 9 and, hence, said gear 9 is put between the gears 7 and 6. Since the free end of the shaft 8 is provided with a spring 8a that biases the gears 6 and 7 toward the base of the shaft 8, all of the gears 6, 7 and 9 are forced to slide as a whole in the axial direction of the shafts 8 and 10.

Figure 5:
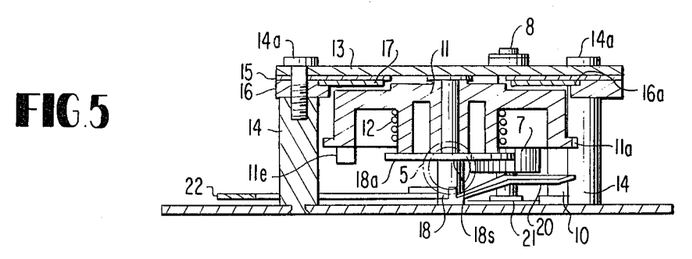
FIG. 5 is a sectional view of a part of the counter shown in FIG. 3 taken along line V—V.

As can be seen from FIGS. 3 and 5, the camera body is also provided with a shaft 18 which is rotatably mounted with a dish-shaped counter drum 11. The drum 11 has integrally formed therewith a gear 11a at its periphery which selectively engages either of the gears 6 and 7 or left disengaged in a manner described later.

The shaft 18 has at its midway a stepped portion 18s which carries a support plate 18a thereon. The counter drum 11 is rotatably mounted to said shaft 18 by securing the central hub to said support plate 18a (refer to FIGS. 5 and 9). A return spring 12 is loosely wound around the periphery of the hub of said counter drum 11 with one end being fixed to a stopper pin set to an appropriate position on the camera body and the other end being fixed to a pin 11d set within a recess of said drum 11 as shown in FIG. 10. Since the spring 12 is mounted in such a manner that it is gradually wound closer to the hub as the counter drum rotates with its gear 11a formed along the periphery thereof engaging the gear 6 or 7, if the engagement between the gear 11a and gear 6 is lost, the counter drum 11 is instantaneously rotated in a reverse direction until another pin 11c set within the recess of the drum 11 is abutted against the stopper pin set to the camera body whereby the drum stops. Accordingly, film counting is achieved by making an indicator 11b on the surface of the counter drum 11 as shown in FIGS. 3 and 9 by taking, as the reference, the initial positions of the stopper pin set to the body and pin 11c on the drum.

Figure 9:
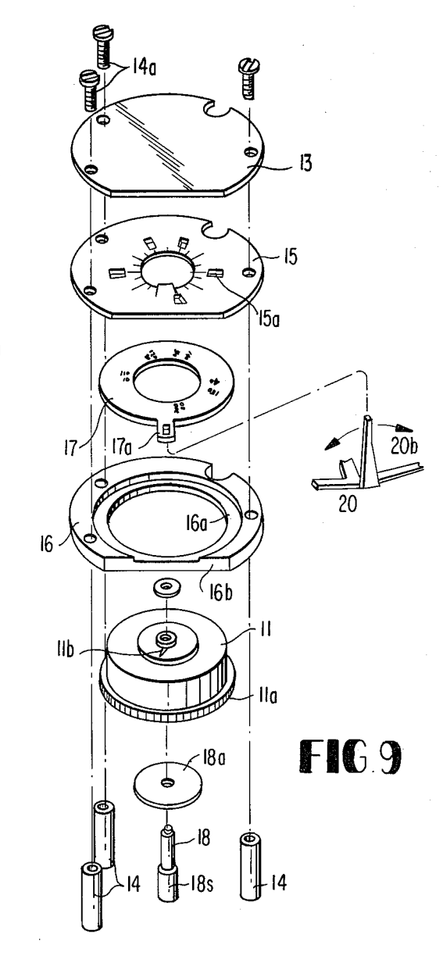
FIG. 9 is an exploded perspective view showing the counter drum section.
Figure 10:
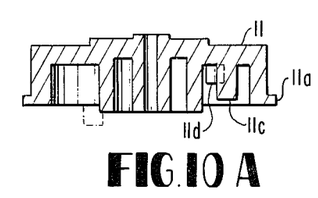
FIGS. 10A and 10B show respectively a vertical sectional view and end view of a counter drum.

As can be seen from FIGS. 5 and 9, studs 14, for example, three in number, are fixed to the inner wall of the camera body on the positions surrounding said counter drum 11 and the top of each stud 14 is formed with threaded hole. There are placed from above the studs 14 one over another, a ring-shaped base plate 16 having a central aperture of a size capable of surrounding the counter drum 11 and formed with a stepped portion 16a along its inner wall, a figure plate 17 loosely engaged and rotatable on said stepped portion 16a and having counting figures and a projection with an aperture through which a bent-up lug 20b of a detection lever 20 to be described later is inserted, a dial plate 15 having a circular bore on the center for exposing the indicator portion of said counter drum 11 and formed with scales and windows 15a for selectively showing two rows of figures for counter indication on the periphery thereof, and a transparent plate 13 externally exposed and enabling the reading of said dial plate, figures, indicator, etc. from the outside. Of the foregoing members, the base plate 16, dial plate 15 and the transparent plate 13 are, respectively, formed with apertures on the positions corresponding to said studs 14 and they are fixed to the studs 14 by means of screws 14a after they are assembled as shown in FIG. 5. The base plate 16 has a flat surface 16b formed by partially cutting off its outer periphery as shown in FIG. 9. The projection 17a of said figure plate 17 radially projects over the flat portion 16b and shifts along said portion 16b depending upon the swinging of the bent-up lug 20b of the detection lever 20 in the manner described later thereby enabling the figure plate 17 to selectively take either of two positions. Scales, for example, dividing the circumference into 20 parts, are indicated along the periphery of the circular opening in the center of the dial plate 15, and counter figures indicating appropriate film footages are indicated on the figure plate 17 so as to correspond to the photographic films of 200 ft. and 50 ft. in the embodiment of the present invention. In said dial plate 15, view windows 15a are apertured adjusted to the scales in a size capable of exposing only one of the pair of figures.

The recess in said counter drum 11 is further provided with pins 11c, 11d and 11e, shown in FIG. 10. The pin 11c serves to determine the initial position of the counter drum 11 by abutting against the pin 19 on the camera body, the pin 11d retains one end of the coil spring 12 and winds up same closer around the drum hub as the counter drum 11 rotates at the time of taking photographs and the pin 11e serves to indicate that the photographic film arrives to its final end and the photographing operation should be stopped by abutting against a pressure plate 26 (FIGS. 3 and 4) for the contacts of a microswitch 25 to be described later and thereby actuating said microswitch as the drum 11 rotates.

A description will now be given of the detection mechanism that automatically detects the specified length of a loaded photographic film, by making use of the loading action of the film, and that operates the indicator for the desired scales.

Figure 4:
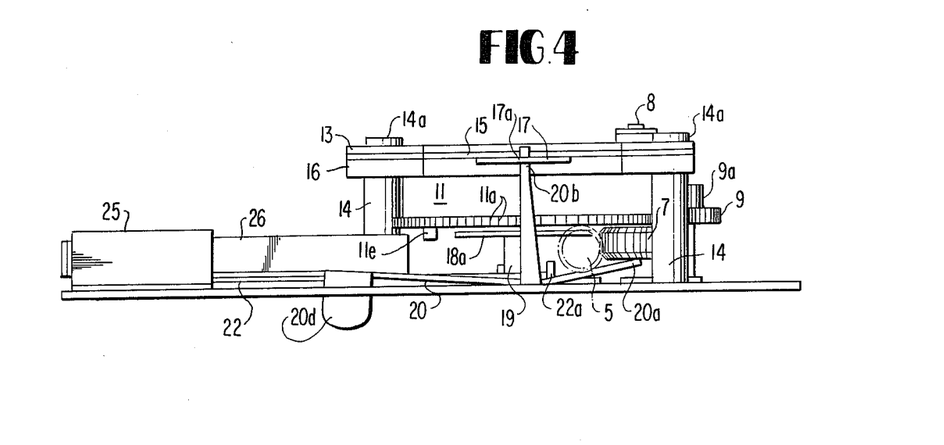
FIG. 4 is a sectional view of a part of the counter shown in FIG. 3 taken along the line IV—IV.
Figure 7:
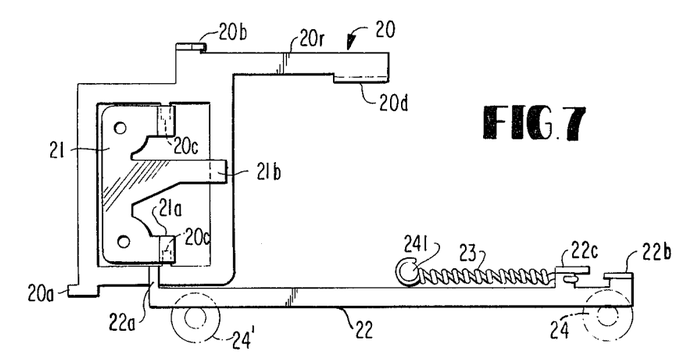
FIG. 7 is a schematic view showing the disposition of a detection lever for cartridges.

The detailed construction of the mechanism is best shown in FIG. 7 and the relation between said mechanism and other components is illustrated in FIG. 3. The detection lever 20 is formed integrally as a whole and comprises a rectangular-like portion consisting of a pair of fulcrum points 20c and 20c, an arm 20r extending from said portion and having at its top a detection portion 20d that projects into the loading space for the film cartridge in a camera body, a bent-up lug 20b that is formed by bending up from the base of said arm, and an engaging portion 20a formed on a side opposing to the foregoing portions and engaging the bottom face of said gear 7. The detection lever 20 is somewhat bent upwardly along a line passing through said pair of fulcrums 20c, 20c, and it forms a shape of gull wing or a letter V when viewed from the side, as can be seen in FIG. 4. The detection lever 20 thus formed in V-shape is disposed so that the engaging portion 20a situates below the lower face of the gear 7. Detection portion 20d situates on a position projected into the film loading space in the camera body and the bent-up lug 20b loosely engages the aperture provided in the projection 17a of the figure plate 17. In this state, said one pair of fulcrums 20c and 20c are pressed by two of three tops 21a projected from a leaf spring 21 approximately of E-shape that is fixed, for example, to the camera body, and one side of the rectangular portion of the detection lever 20 is engaged with the resilient projection 21b formed at the middle of said leaf spring 21 and thereby the arm 20 is resiliently biased in the direction from the rear side to the front side of the sheet of the drawing as seen in FIG. 7.

A cartridge detection lever 22 having, at one end and abutting piece 22a which abuts against the side of the rectangular part of lever 20 (opposing to the side having the arm 20r), a cartridge detection portion 22b at the other end, and a retention lug 22c is mounted in the vicinity of the rectangular portion of said detection lever 20 between two rollers 24 and 24', rotatably attached to the body, and a fixed pin 241. The lever 22 is therefore slidable only in the longitudinal direction. A tension spring 23 is suspended between said fixed pin 241 and retention lug 22c and usually biases said lever 22 through its resilient force to the left in the drawing and, consequently, the abutting piece 22a at the left end is normally situated beyond said fulcrum point 20c to the left side of the engaging portion 20a of the lever 20. The spring 23 thus biases the engaging piece 20a of the lever 20 in the direction into the sheet of the drawing (FIG. 7) against the resilient force of said resilient projection 21b.

As can be seen from the foregoing, detection lever 20 undergoes forces from said resilient projection 21b tending to rotate lever 20 in one direction about the fulcrum points 20c and 20c, and undergoes other forces from spring 23 and spring 8a (FIG. 6) tending to rotate the lever 20 in the opposite direction. Therefore, by properly setting these spring forces, the lever 20 can be held in a position where the gear 11a formed on the periphery of the counter drum 11 can be situtated at an intermediate point between the gears 6 and 7 in the gear train (refer to FIG. 6C).

Figure 2:
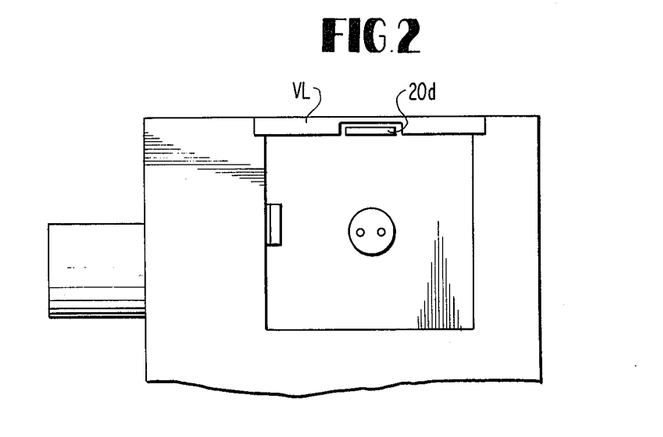
FIG. 2 is a side elevational view of the cine-camera in FIG. 1 with the side cover removed showing the relation between a top cover and a detection portion.
Figures 8, 11:
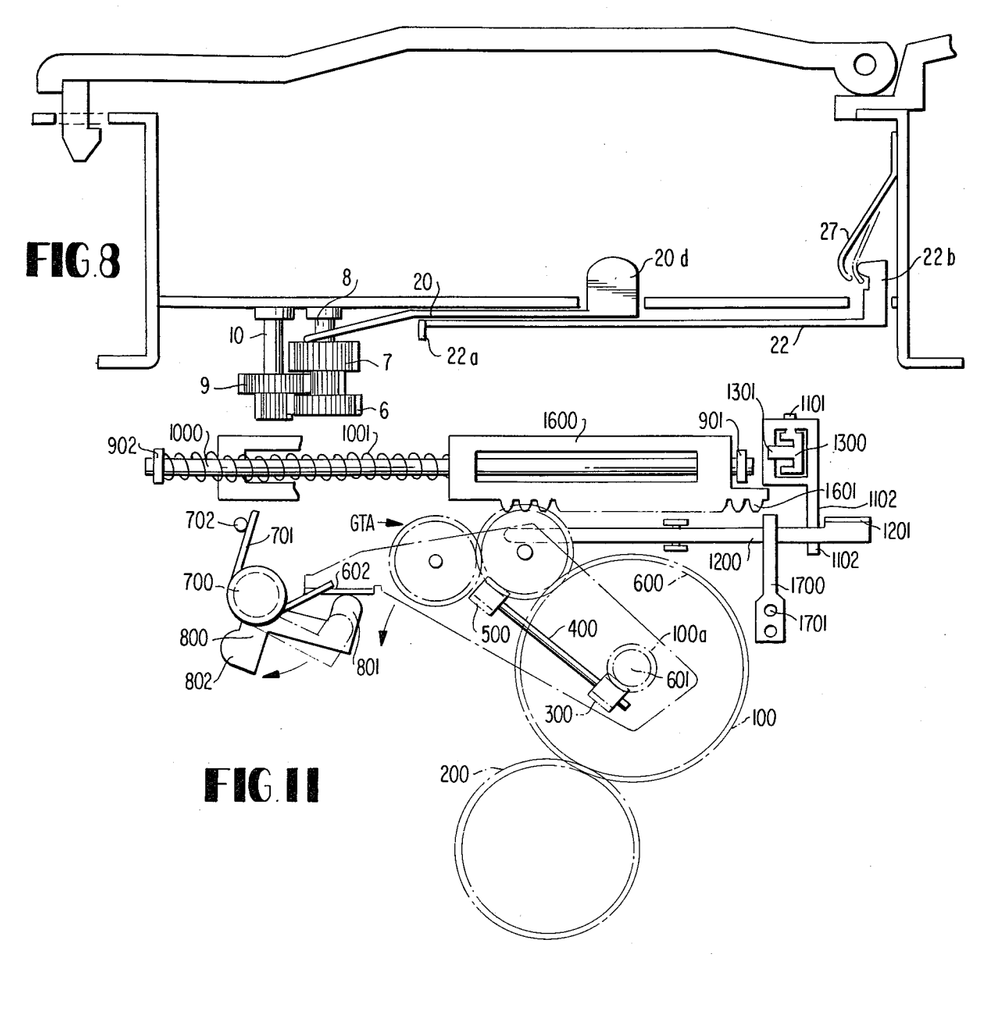
FIG. 8 is a sectional view showing the relaton of the detection end of a detection lever for each cartridge to the loading space for cartridge in the camera body.
FIG. 11 is a schematic view showing another embodiment of a film counter of the present invention.

The detection portion 20d of the detection lever 20 is projected near the top of the film loading space of the camera body as can be seen from FIGS. 2 and 8, and the detection end 22b of the lever 22 is also projected into said film loading space. It can easily be understood that, relative to the detection portion 20 situated near the top of the film loading space, the end 22b of the lever 22 is situated below in the film loading space as shown in FIG. 2, in this embodiment.

Referring further to the detection portion 20d of the lever 20 and the detection end 22b of the lever 22 each projecting into the film loading space of the camera body, the portion 20d stays so as to be contained within the recess of the top cover as previously mentioned and not to project further below in FIG. 2. Therefore, it will be understood that when the cartridge is loaded by opening the side cover, only the detection end 22b is actuated and the detection portion 20d can not be actuated unless the top cover is opened too.

In FIG. 3, reference numeral 25 denotes a microswitch fixed to the camera body to control, for example, a pilot lamp which indicates that the film has reached its end. When the counter drum 11 rotates and its pin 11e abuts against a pressure plate 26, the microswitch is actuated.

The film counter according to the present invention operates in a manner described below.

When no cartridges are loaded on a camera body, the detection lever 20 takes its neutral position by the resilient forces of the resilient projection 21b of the leaf spring 21, spring 23 and spring 8a as shown in FIG. 6C to leave the counter drum 11 unengaged. Therefore, the counter drum 11 is held stationary, under the force of the coil spring 12, at a position where the stopper pin 19 on the camera body and the pin 11c on the drum abut against each other. In this state, the figure plate 17 is situated to a position where the zero scale of the dial can be seen from the outside, by the control of the bent-up lug 20b of said detection lever 20.

Then, when a cartridge containing a photographic film of 50 ft. length is loaded on the camera in this condition of the counter by opening the side cover SL (FIG. 8) just as in a conventional 8 mm cine-camera, the leaf spring 27 at the side of the loading space for the film is pressed by this loading action and then the detection portion 22b of the lever 22 is shifted (to the right in FIGS. 7 and 8) thereby forcing the abutting piece 22a on the other end of said lever 22 to the right at least as far as the axis that passes through a pair of fulcrum points 20c and 20c in FIG. 7. The biasing force of the spring 23 exerted on the lever 20 is thus removed and the lever 20 rotates by the force of the resilient projection 21b to the position shown in FIGS. 5 and 6A to bring the gear 7 and the gear 11a of the counter drum 11 into engagement. The bent-up lug 20b of the lever 20 is then rotated simultaneously to guide the figure plate 17 to a position where the scales corresponding to 50 ft. film can be seen completely through the windows in the dial plate 15. When the photographing operation is started from this state, the rotation of the gear 1 in synchronism with the film feeding mechansim is transmitted to worm 1a, worm wheel 3, worm 5, gear 7 and gear 11a successively to rotate the counter drum 11 against the resilient force of the spring 12, and the length of the photographic film that has been spent can be read from the outside in accordance with said rotation.

Since the position of the counter drum 11 at which a certain length of the film has been exhausted is predetermined and the pin 11e is set for this position, when the film comes to its final end, said pin 11e forces the pressure plate 26 to actuate the microswitch 25 thereby giving appropriate indication in a finder not illustrated such as the light-up of a red lamp for the end of the film.

Then, by opening the side cover SL and unloading the cartridge from the camera body thereafter, the lever 22 returns to its initial position by the action of the spring 23, which causes the detection lever 20 to rotate thereby situating the gears 7, 9, 6, etc. to the neutral position illustrated in FIG. 6C. The engagement between the gear 7 and the gear 11a of the counter drum 11 is thus lost and the drum 11 is instantaneously returned by the returning force of the spring 12 tightly wound therearound to the initial position where the stopper pin 19 and the pin 11e on the drum abut against each other. Simultaneously, rotation of the bent-up lug 20b of the lever 20 returns the figure plate 17 to its initial position where zero scale can be seen from the outside to indicate that a new cartridge can now be loaded.

It is emphasized again that since the detection portion 20d for the detection of a 200 ft. film is housed within the recess made in the inner side of the top cover VL, a cartridge for a 50 ft. film does not abut against said portion 20d in its loading or unloading.

The counter operation in using a 200 ft. film will now be described.

The top cover VL as well as the side cover SL of the camera body are opened and a cartrige is loaded in the space for the film and it is assumed here that said cartridge consists of, as in conventional ones, a portion like that of the cartridge for 50 ft. film and a film containing portion integrally formed thereover. The cartridge inserted displaces the lever 22 as in the case of the cartridge for the 50 ft. film and simultaneously presses the detection portion 20d since the portion is now exposed by the opening of the top cover VL. The pressure exerted on the detection portion 20d rotates the lever 20 forcedly to the position illustrated in FIG. 6B irrespective of the displacement of the lever 22 and the biasing force of the resilient projection 21b. The gear trim is therefore securedly held by the action of the spring 8a at the position shown in FIG. 6B whereby the rotation of the worm 5 is transmitted through gear 7, its pinion, 7a, gear 9, its pinion 9a and gear 6 to the gear 11a of the counter drum 11. Simultaneously therewith, the bent-up lug 20b of the lever 20 guides the figure plate 17 to the position where the scales corresponding to the 200 ft. film can be seen through the windows in the dial plate 15. When the photographing operation is started in this condition of the counter, the drum 11 rotates and indicates the length of the spent film, until the microswitch is actuated to indicate the end of the photographic film as in the above case.

On unloading the cartridge after the end of the photographing operation, each member returns to the initial position shown in FIG. 6C by the actions of the resilient projection 21b, spring 23, etc.

The embodiment illustrated above is constructed in such a way that the loading or unloading state of the cartridge can also be confirmed by the indication of the intermediate portions between two rows of counting figures arranged side by side through the windows when each component takes its neutral position as illustrated in FIG. 6C.

Alternatively, it can be constructed so that the detection lever 20 takes the position shown in FIG. 6A in both of the cases where neither of the cartridges is loaded on the camera and a standard 50 ft. film is loaded on the camera, and each member is displaced as shown in FIG. 6B only when a 200 ft. film is loaded, whereby the components such as the detection portion 22b of the detection lever 22, tension spring 23, leaf spring 27 and the like can be saved and the structure is thereby simplified.

In the foregoing embodiments for the film counter of the present invention, a rotary member is used for the counter indication but it can easily be understood base on the above embodiments that the indication mechanism interlocking with said gear 6 can be a linearly shifting member, for example, having racks at an appropriate portion instead of the foregoing rotary drum in the above embodiment, so as to indicate the film length in connection with the linear shifting of said member. In such as structure, the indication of the figure plate naturally appears along the straight line and said figure plate is adapted to shift linearly under the control of the swinging of the bent-up lug of the detection lever. Description is now made for another embodiment of this invention in which a linear counter mechanism is employed.

Figure 14:
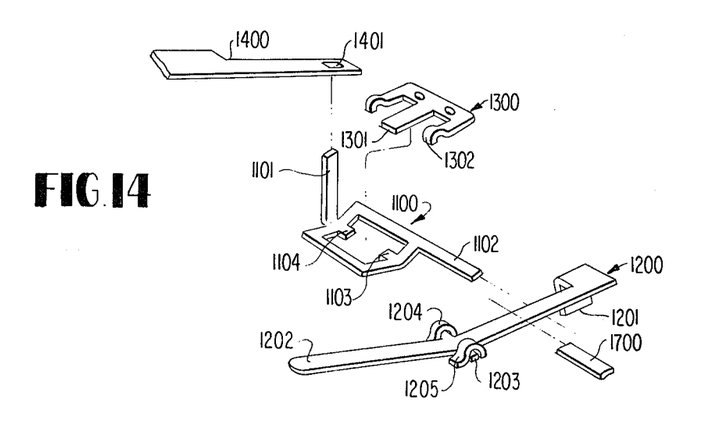
FIG. 14 is an exploded perspective view of a turn over mechanism for the figure plate shown in FIG. 12.

In FIG. 11 of the drawings, there are shown, mounted on the mechanism on the camera body, a film take up gear 200, a gear 100 associated with the shutter release action, worm 100a rotated integrally with said gear 100, worm gear 300 provided at one end on a rod 400 and meshing said worm, worm 500 at the other end of the rod, and gear train assembly GTA always meshing said worm 500 and mounted to a rotary plate 600 to be described later. These components other than said rotary plate 600 are quite similar to those in the foregoing embodiments and the details thereof are not repeated here. A detection lever 1200 for the detection of a 200 ft. film which is bent in a V-shape at the center of its length is supported at appropriate positions by the camera body so that it can slightly swing on a pair of its projections 1203 projecting from both sides of said bent center by means of fixtures 1204 and 1205 which are bent approximately in a semi-circular shape (see FIG. 14). As can be seen from FIGS. 11 and 14, an abutting portion 1202 at one end of said detection lever 1200 extends as far as the bottom of the gear train assembly GTA and abuts against the lower face of the gear 7 in like manner explained in the foregoing embodiment. The other end of the lever 1200 is bent and formed as a detection portion 1201 which projects to a position for the detection of a cartridge for a 200 ft. film just as the detection portion 20d in the previous embodiment.

As apparent from FIG. 11, a part of the detection lever 1200 is pressed by a leaf spring 1700 secured at one end by a fixture 1701. This biases the abutting portion 1202 apart from the base plate of the camera body whereby the gear train assembly is pushed upward to a position corresponding to the counting of a standard film (corresponding to a position illustrated in FIG. 6A for the previous embodiment).

It is also apparent from FIG. 11 that a turn over lever 1100 is supported by retention portions 1302 of a resilient member 1300 secured to the camera body and biased in one direction by a central resilient projection 1301 of said member 1300. A part of the lever extends as an arm 1102 to a position below said detection lever 1200. In this way, the turn over over 1100 is held at a balanced position regarding the actions of the resilient projection 1301 and the leaf spring 1700.

Figure 12:
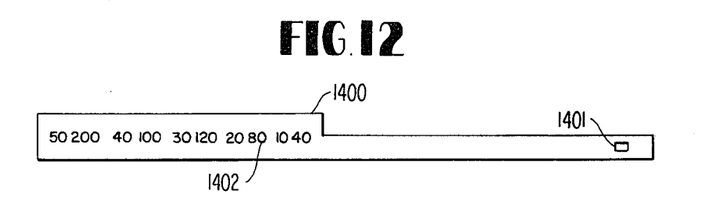
FIG. 12 is a view showing a figure plate for use with the film counter in FIG. 11.

The turn over lever 1100 further has a turn over piece 1101 formed by bending up and engaging at its top with an aperture 1401 provided in the end of the figure plate 1400 (FIGS. 12 and 14) which is slidably mounted at the back of the camera body by suitable means. Two kinds of figures, respectively, corresponding to 50 ft. film and 200 ft. film are provided on the figure plate as in the previous embodiments.

Figure 13:
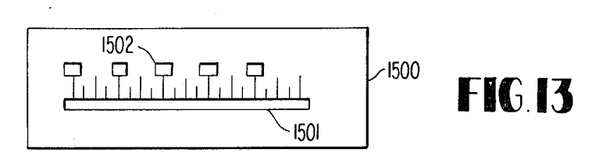
FIG. 13 is a view showing a dial plate for use with the film counter in FIG. 11.

A dial plate 1500 (FIG. 13) apertured with indication windows 1502 is secured to the camera body at the outer side of the face of the figure plate (seeing from the outside of the camera) and the dial plate has a long slit 1501 apertured therein.

A rod 1000 is secured at its both ends by brackets 901, 902, etc., under the dial plate 1500 and is slidably mounted with rack member 1600 notched with racks 1601. The rack member 1600 is usually biased to the right in FIG. 11 by way of a return spring 1001 wound around the rod 1000. The rack member 1600 is positioned such that it fills the long slit 1501 as it moves to the left.

The operation of the counter in this embodiment is described below. Reference will initially be made to the case where a standard 50 ft. film is used. Since the gear trim as assembly GTA abutting against the abutting portion 1202 of the detection lever 1200 is usually biased upward by the leaf spring 1700, the advance of the film is transmitted by way of a worm 500, and a gear corresponding to the aforementioned gear 7 in the gear train assembly to the rack 1601 to shift the rack member 1600 to the left in FIG. 11, thereby filling the long slit 1501 in the dial plate 1500 and providing an indication of the progress of the film. Since the turn over piece 1101 and hence the figure plate 1400 is situated corresponding to the position of the detection lever 1200, the figures corresponding to the length of the photographic film appear in the windows to indicate the length of said exhausted film.

When a 200 ft. film is loaded, the cartridge presses the detection portion 1201 to swing the lever 1200 and lower the abutting portion 1202 at the other end, whereby the gear train assembly GTA is also biased in one direction by the spring 8a. While the worm 500 is engaged with the same gear as in the above case for the 50 ft. film, the rack now interlocks with another gear in the gear train assembly that corresponds to the foregoing gear 6 and hence the rack member travels in the reduced speed as in the previous embodiments. At the same time, the swinging of the detection lever 1200 now allows the resilient projection 1301 to sufficiently act on the turn over lever to rotate same, which is followed by the sliding of the figure plate 1400 to indicate the figures corresponding to 200ft. film in the windows 1502.

As mentioned above, a rotary plate 600 is pivotably mounted to the shaft of the gear 100 associated with the shutter operation and provided at its other end with a bend-up portion 602.

A pin 700 is set at an appropriate position on the camera body and wound with a spring 701 one end of which is secured to a fixed pin 702 and the other end of which is engaged to said bent-up portion 602. Two shafts for supporting each of the gears in said gear train assembly GTA are mounted to this rotary plate 600 whereby said gear train assembly GTA is provided with a tendency usually to escape from the racks 1601 by the force of the spring 700. To the pin 700, a bell crank-type member 800 is loosely engaged with its one end 801 being abutted against the portion 602 and the other end 802 being projected into an appropriate position within a cartridge loading space of the camera. Accordingly, when a cartridge is loaded on the camera, it causes the bell crank member 800 to take the position illustrated in FIG. 11 to engage the gear train with the racks 1601. On the contrary, on unloading the cartridge, the rotary plate 600 is rotated a small amount by the force of the spring 701 in the counterclockwise direction thereby releasing the engagementbetween the gear train and the racks. The rack member 1600 which has been displaced to the left in FIG. 11 with the advance of the film during photography is therefore returned rapidly to its zero position by the action of the return spring 1001.

The film counter of the present invention has the construction as described above and is adapted to transfer the counter operation between two different film lengths automatically, using a relatively simple and small mechanism without increasing the volume of the camera body per se.

What is claimed is:

1. A film counter for use with a cine-camera capable of selectively using first and second cartridges respectively containing photographic films of first and second lengths, said film counter comprising:
  a. counter indicator means;
  b. gear train means for moving said counter indicator means at first and second speed ratios, corresponding to said first and second film lengths, coincidently with the movement to said film during photography, when said gear train means is in a first and second state, respectively;
  c. figure indicator means having a first and second set of numbers thereon, said figure indicator means being positioned to display only one of said first and second sets of numbers, adjacent said counter indicator means, when said figure indicator means is in first and second positions, respectively; and
  d. cartridge detecting means responsive to the loading of said first and second type cartridges for causing said gear train means to be in said first and second states, respectively, and for causing said figure indicator to be in said first and second positions, respectively, said cartridge detecting means comprising a detection lever having a detecting portion, actuated with a flat wall of a film cartridge of said second type and positioned to be moved from a normal position to second position.

2. A film counter as defined in claim 1, further comprising a second lever positioned to be actuated by the loading of either type of cartridge, said second lever positioned to bias said gear train means to disconnect said gear train means from operable relation with said counter indicator means, when said second lever is unactuated.

3. A film counter as defined in claim 1, wherein said figure indicator comprises a dial plate, a figure plate having two rows of figures, each row corresponding to a different one of the first and second film lengths, said dial plate and figure plate being positioned one over the other and being relatively displaceable so as to cause one or the other rows of figures to appear adjacent the dial plate.

4. The film counter as defined in claim 1, wherein said counter indicator means comprises a rotary drum associated with and driven by said gear train means and a counting indicator on said rotary drum, and wherein said figure indicator comprises a dial plate for reading the length of the spent photographic film in cooperation with the indicator of said drum and a figure plate capable of displacement relative to said dial plate to indicate a prescribed row of figures on said dial plate.

5. A film counter as defined in claim 4, further comprising a switch for generating a signal indicative of the end of counting, and means mounted to said rotary drum for actuating said switch when said drum reaches a predetermined rotational position.

6. A film counter as defined in claim 4, further comprising stopper means provided on the rotary drum and on the camera body to restrict the rotating amount of the rotary drum.

7. A film counter as defined in claim 2 wherein said figure indicator additionally has a third position in which neither of said sets of numbers is displayed adjacent said counter indicator means, said second lever biasing said figure indicator in said third position when no film cartridge is loaded.

8. A film counter as defined in claim 2, wherein said cartridge detecting means comprises biasing means, acted upon by said detection lever and said second lever for:
a. biasing said gear train means and said figure indicator in said first state and said first position when a first type cartridge, actuating only said second lever, is loaded,
b. biasing said gear train means and said figure indicator in said second state and said second position when a second type cartridge, actuating said detection lever and said second lever, is loaded, and
c. disconnecting said gear train from operative association with said counter indicating means and biasing said figure indicator in a third position intermediate said first and second position when no cartridge is loaded.

9. A film counter as defined in claim 1, wherein said detection lever comprises a rectangular frame, an arm extending from one side of said frame and projected to a position in cartridge loading space of said camera as to engage with only one type of cartridge, a bent-up end rising from said one side and engaging said figure indicator means, said rectangular frame having a V-shaped bend about an axis that intersects said one side and a second side opposite thereto in such a way as to cause the remaining two sides of said rectangular frame to come closer to each other, said cartridge detecting means further comprising first biasing means for resiliently biasing said detection lever in a first rotational direction about said bend axis which presses one of said other sides against said gear train means to place said gear train means in first position and causes said bent-up end to place said figure indicating means in said first position.

10. A film counter as defined in claim 9, wherein said cartridge detecting means further comprises a second lever, one end of which engages the rectangular portion of said first lever and the other end of which projects to such a position in the cartridge loading space of the camera as to be actuated by loading of said first or second type cartridges, said second lever biasing said first lever resiliently to a second rotational direction opposite to said first rotational direction, the combined biasing forces of said second lever and said first biasing means maintaining said detection lever a balanced position to result in said detection lever breaking the engagement between said gear train means and said counter indicating means and, simultaneously therewith, the bent-up end of the detection lever is at a position to cause said figure indicator means to be intermediate said first and second positions.

11. A film counter as defined in claim 1 wherein said gear train means comprises:
a. first and second shafts,
b. a first gear rotatably and slidably mounted on said first shaft and adapted to be driven in synchronism with the driving of said film, said first gear having an adjacent pinion formed integral therewith,
c. a second gear rotatably and slidably mounted on said first shaft positioned adjacent to said pinion,
d. a third gear having an adjacent pinion formed integrally therewith, said third gear and pinion being rotatably and slidably mounted on said second shaft, said third gear meshing with the pinion of said first gear, and said second gear meshing with the pinion of said third gear, all said gears being biased axially along said first and second shafts in one direction.

12. A film counter as defined in claim 11, wherein said counter indication mechanism means comprises a linear member having racks for engaging and disengaging said gear train means.

13. A film counter as defined in claim 11, wherein said figure indicator comprises a dial plate, a figure plate having two rows of figures, each row corresponding to a different one of the first and second film lengths, said dial plate and figure plate being positioned one over the other and being relatively displaceable so as to cause one or the other rows of figures to appear adjacent the dial plate.

14. A film counter as defined in claim 12, wherein said gear train means is biased in a direction to disengage said gear train mechanism from engagement with said racks, and is brought into engagement therewih only when a cartridge is loaded.

* * * * *